March 7, 1933.  M. G. BENJAMIN  1,900,036
FURNACE CONTROL
Filed March 31, 1924  6 Sheets-Sheet 1

INVENTOR
Morrill G. Benjamin
By Byrnes, Stebbins & Parmelee
His Attys

March 7, 1933.  M. G. BENJAMIN  1,900,036
FURNACE CONTROL
Filed March 31, 1924  6 Sheets-Sheet 2

INVENTOR
Morrill G. Benjamin
By Byrnes, Stebbins, Parmelee
His Attys

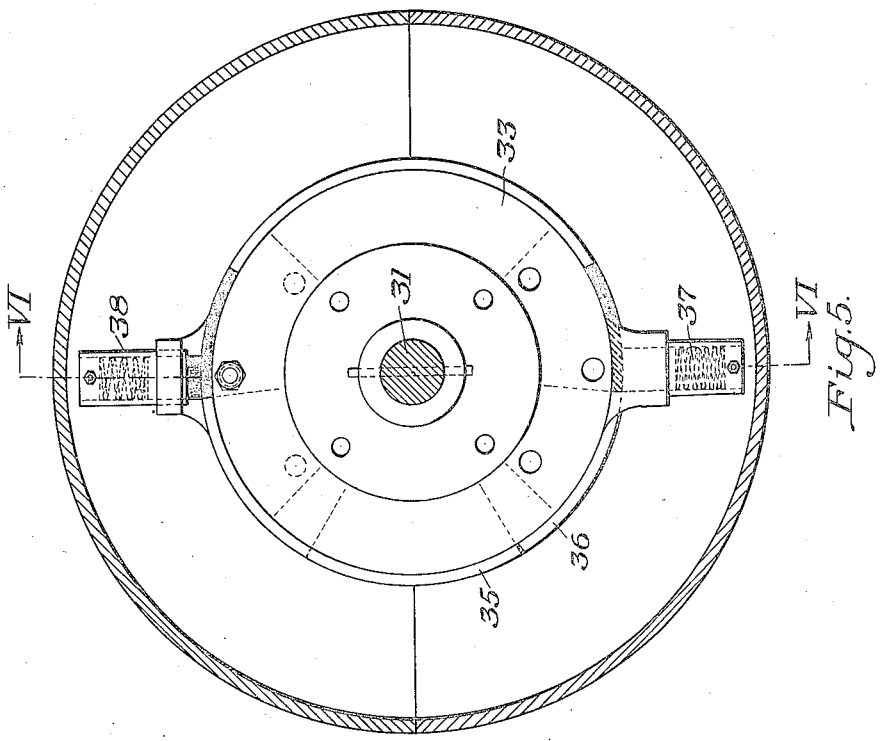
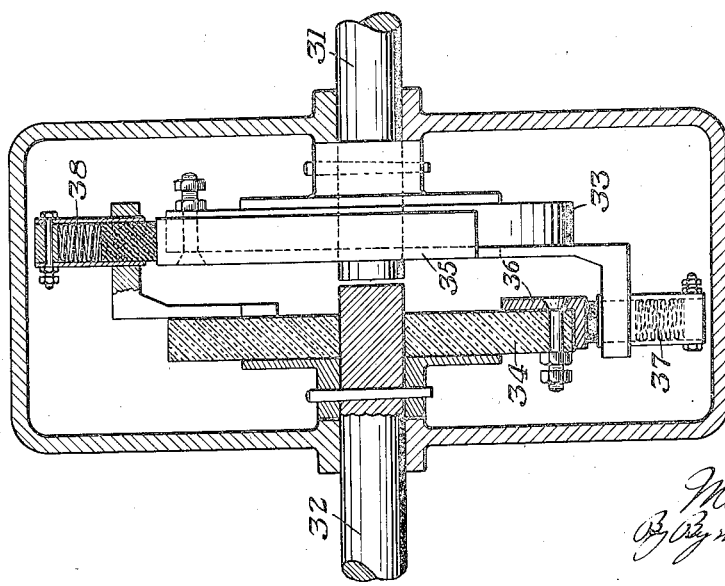

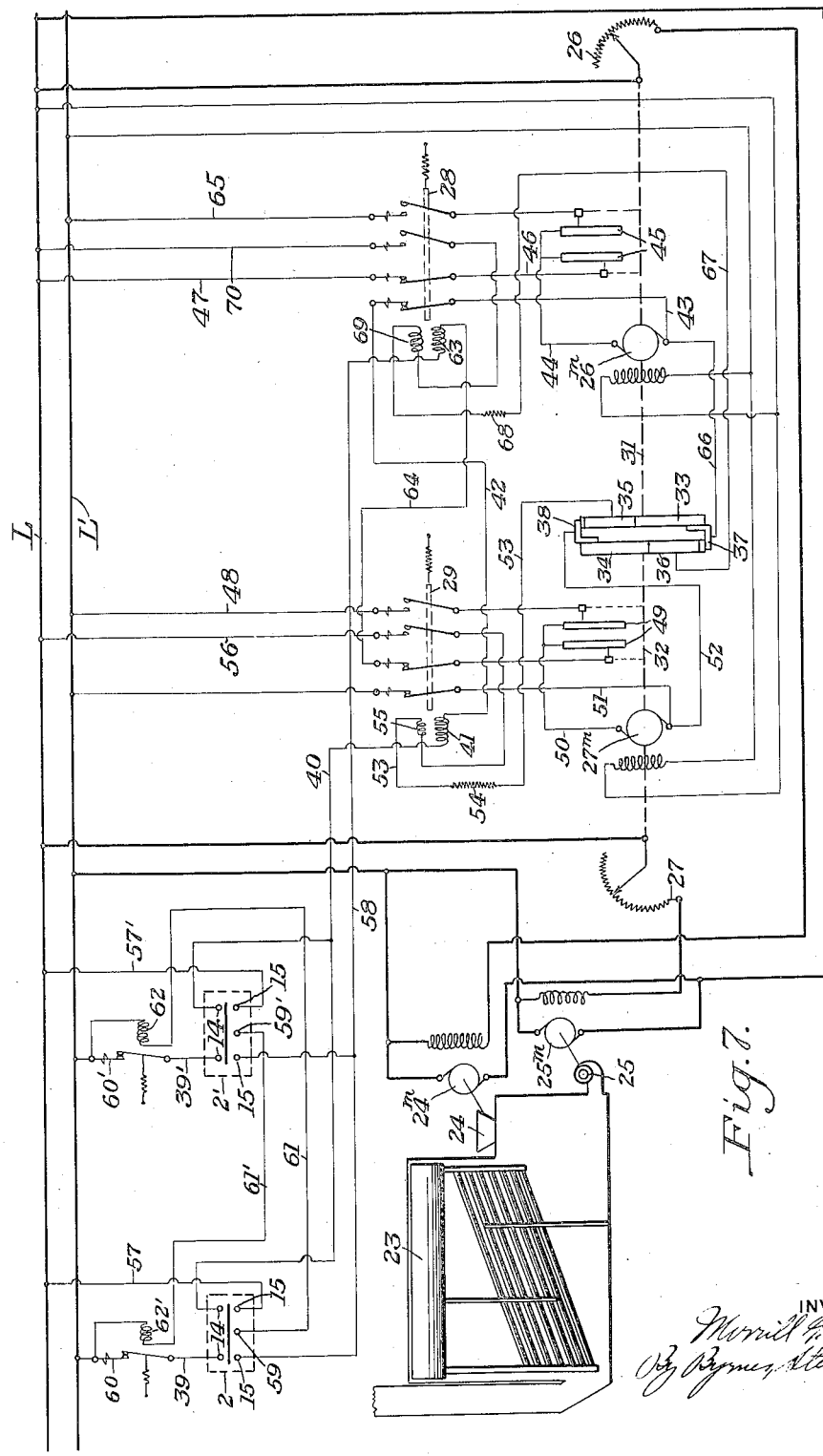

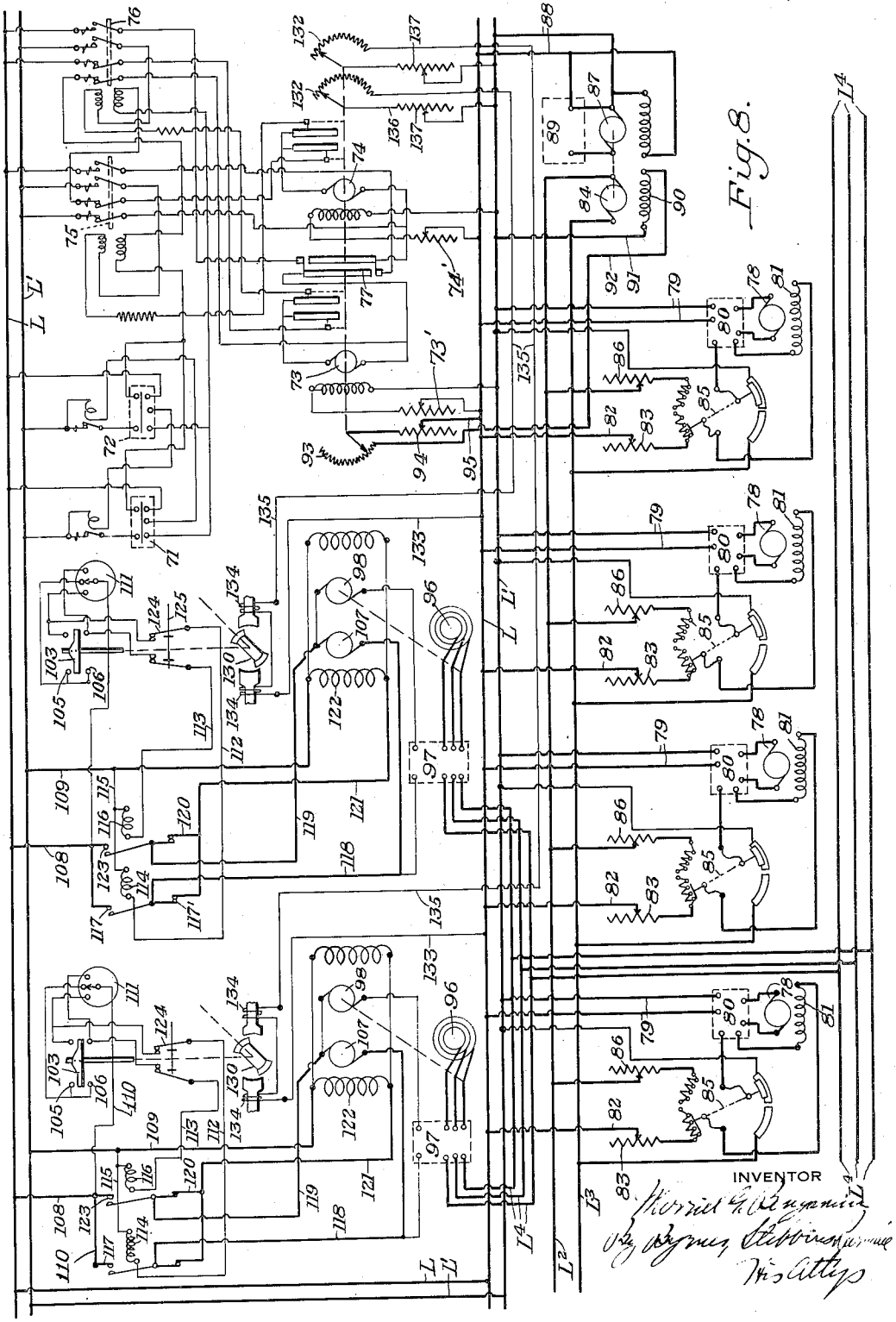

March 7, 1933. M. G. BENJAMIN 1,900,036
FURNACE CONTROL
Filed March 31, 1924 6 Sheets-Sheet 6
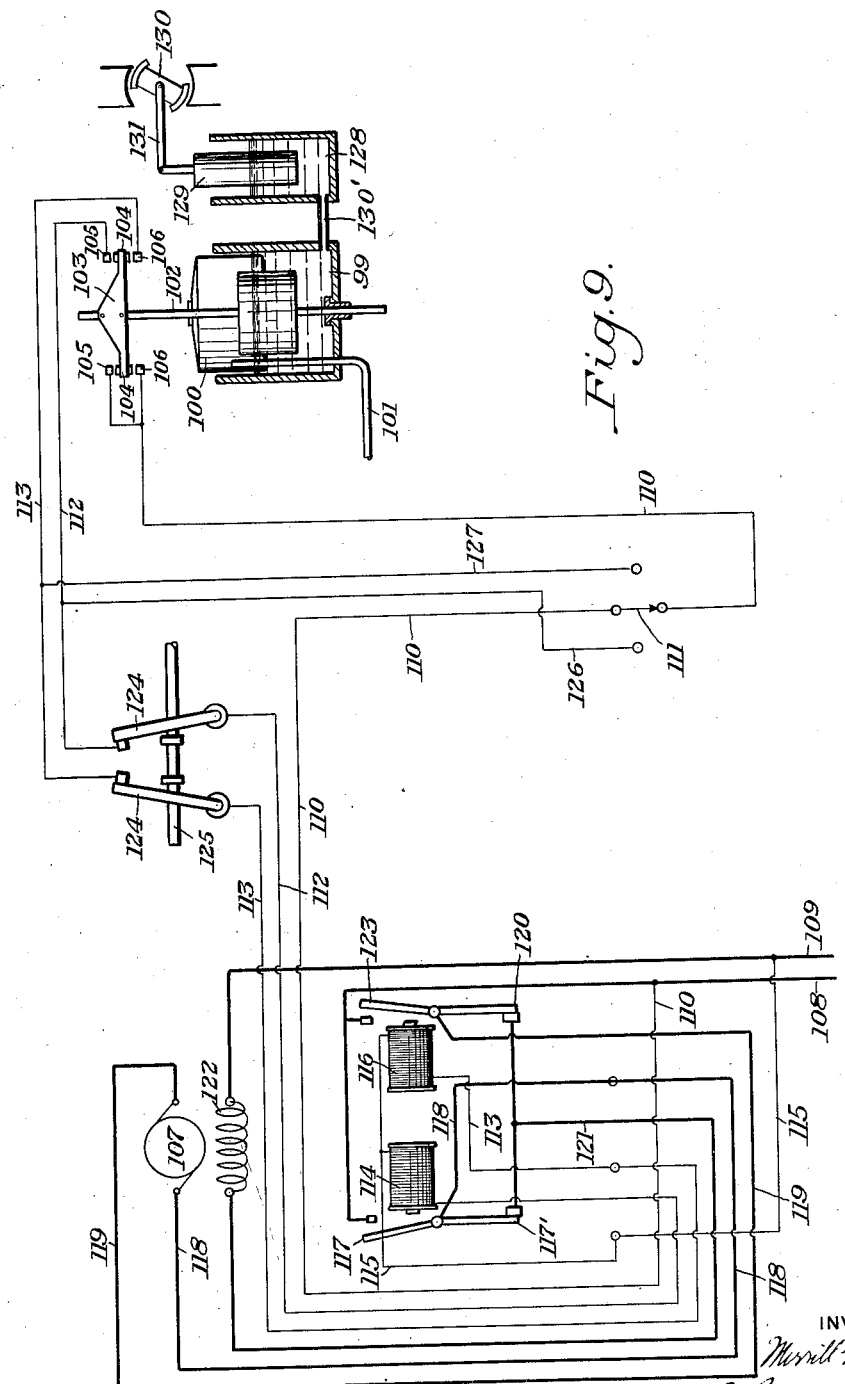
INVENTOR Patented Mar. 7, 1933

1,900,036

UNITED STATES PATENT OFFICE

MERRILL G. BENJAMIN, OF LAKEWOOD, OHIO, ASSIGNOR, BY MESNE ASSIGNMENTS, TO BAILEY METER COMPANY, A CORPORATION OF DELAWARE

FURNACE CONTROL

Application filed March 31, 1924. Serial No. 703,324.

This invention relates to furnace control and is particularly useful in connection with furnaces using powdered coal for fuel.

I provide for controlling the rate at which fuel and air are supplied to the furnace, and further provide an excess of air when the rate of fuel and air supply is varied. For example, if it is desired to increase the combustion rate, the rate of air supply is increased in advance of the fuel supply, while if the combustion rate is decreased, the rate of fuel supply is cut down ahead of the air. This insures proper combustion over the period of change.

This apparatus may be employed in a power plant, as for example, in connection with one or more boilers supplying steam to one or more units, such as stream turbines. In this case I provide a regulator for varying the rate of combustion in order to maintain substantially constant a condition of the steam, as for example, the steam pressure. Since the load on most central power stations varies during the day, I further provide for varying the normal steam pressure which is maintained by the regulator in accordance with a predetermined time-load relation.

Where a number of units are employed, it is desirable to maintain the steam pressure at least up to normal at each of the units and I therefore provide a plurality of controlling means so interconnected that when the condition of the steam at one regulator falls below normal, it renders the other regulator temporarily inoperative and controls alone until the steam condition is returned to at least normal at that point. The controlling of the combustion rate is preferably accomplished by employing electric motors for regulating the supply of fuel and air and employing motor operated rheostats for controlling these motors. The rheostat motors are in turn controlled by the regulators and are provided with a pair of contacts normally out of contact with each other, but relatively movable by either of the motors and adapted to make electrical connection for starting the other motor and maintaining it in operation after the first motor stops and until the contacts are relatively moved to break the electrical connection.

It will be seen that the rheostat motors may thus be operated over a proper period to proportionate the rate of fuel and air supply, regardless of variations in the combustion rate, and at the same time secure the excess of air which is desirable during a change in the combustion rate of a furnace employing powdered coal.

In the accompanying drawings illustrating the present preferred embodiment of the invention:

Figure 5 is a section on the line V—V of Figure 3;

Figure 6 is a section, partly in elevation, on the line VI—VI of Figure 5;

Figure 7 is a wiring diagram illustrative of my invention as applied to a single boiler unit supplying two turbines;

Figure 8 is a wiring diagram showing another embodiment of the invention as applied to two boilers supplying steam to two turbines; and Figure 9 is a schematic drawing showing the manner of regulating the air supply by controlling the stack damper, together with the electrical connections.

Figure 1:
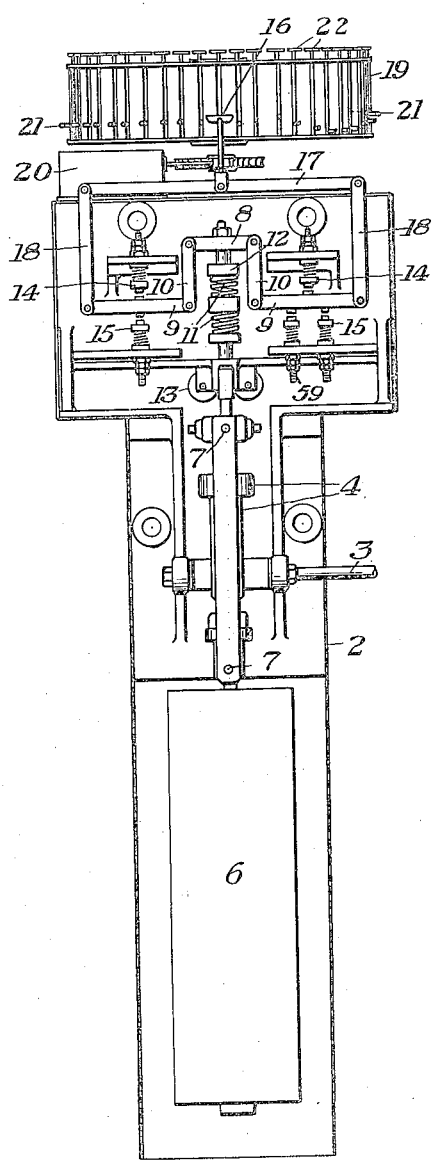
Figure 1 is a front elevation of a regulator constructed in accordance with my invention.
Figure 2:
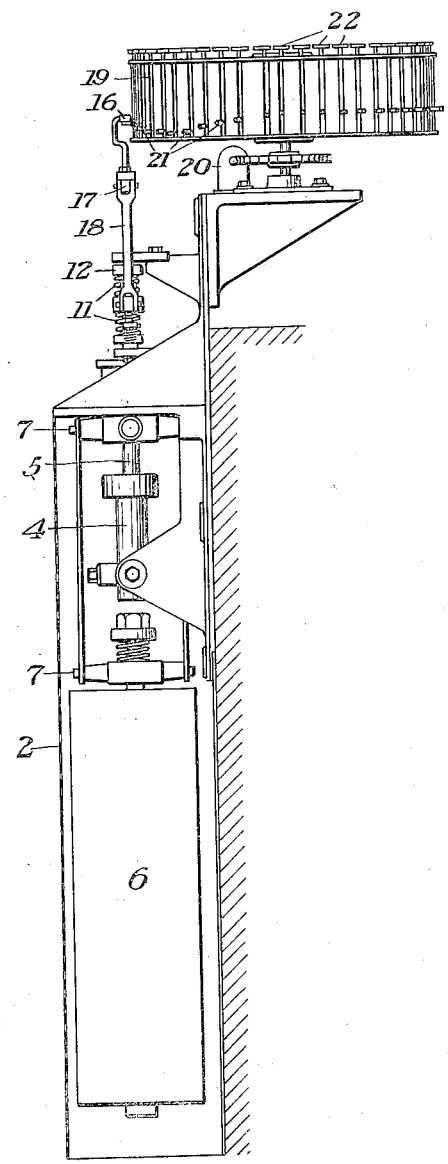
Figure 2 is a side elevation of the regulator shown in Figure 1.
Figure 4:
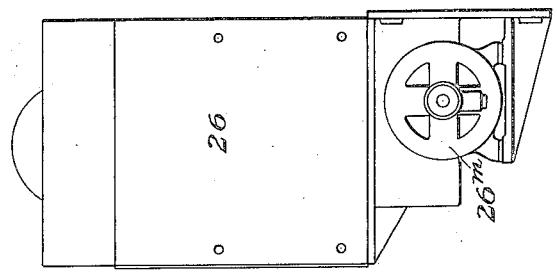
Figure 4 is an end view of the apparatus shown in Figure 3.

In the illustrated embodiment of the invention, a steam regulator, indicated generally by the reference character 2, is connected to the steam main just ahead of the turbine or engine throttle and its purpose is to substantially maintain a predetermined steam pressure at the throttle. The regulator is connected to the steam main by a pipe 3 which terminates in a pivotally mounted cylinder 4. A plunger 5, which is very accurately fitted to prevent leakage, is free to move up and down in the cylinder 4. The steam pressure is substantially balanced by a counter-weight 6 attached to the plunger 5 by a pivotal connection 7. This pivotal connection, together with the pivotal mounting of the cylinder 4, insures that the plunger will always be in a vertical position and is thus conducive of great accuracy in regulation.

As the steam pressure varies, the plunger 5 moves up and down in the cylinder 4 and carries with it a crosshead bar 8 which is connected to contact bars 9 by links 10. Springs 11 provided with nuts 12 are provided for damping the travel of the plunger in regular operation and roller guides 13 are provided for eliminating as much friction as possible. If the steam pressure rises, the contact bars 9 are moved upwardly against spring contacts 14 and make suitable electrical connections for decreasing the combustion rate. If the steam pressure drops, the contact bars 9 are lowered against spring contacts 15 and make suitable electrical connections for increasing the combustion rate.

The springs 11 furnish the varying resistance necessary to establish a definite plunger position for any given steam pressure; and, since most of the steam pressure is balanced by the weight 6, they may be made light enough to provide very sensitive regulation.

Since there are times in central station operation and in industrial plants when it is desirable to begin building up a reserve boiler pressure in anticipation of a sudden load, or to begin dropping the steam pressure, anticipating a drop in the load, I provide time control means for imposing a higher or lower normal pressure for the regulator to maintain. This is accomplished by a vertically movable shoe 16 connected to the contact bars 9 by a cross bar 17 and links 18, whereby the normal position of the bars 9 may be changed by adjusting the vertical position of the shoe 16. This vertical adjustment is secured by a drum 19, driven by clockwork 20, and having adjustable pins thereon corresponding to any desired time interval. For example, the drum may be made to rotate once in twenty-four hours and have the pins 21 corresponding to each ten of fifteen minute interval. When the steam is to be maintained at normal pressure, the pins 21 are placed in a straight line, as viewed, for example, on the left hand side of Figure 1. When a peak load is anticipated, the pins are adjusted downwardly by thumb-screws 22 and when these pins contact with the shoe 16 they will lower the same to make electrical connection through the contacts 15 and raise the steam pressure accordingly. If a drop in load is anticipated, the pins may be moved above normal position to decrease the combustion rate.

Referring to Figure 7, there are illustrated two regulators 2 and 2', which are to be connected to the steam mains just ahead of the throttles of a pair of turbines (not shown). A steam boiler 23 having a feeder 24 and a forced draft fan 25 supplies the steam turbines. The feeder 24 and the fan 25 are provided with motors 24m and 25m respectively and the purpose of the regulators 2 and 2' is to control these motors and thus control the combustion rate in accordance with the steam pressure in a time-load relation as above set forth. This regulation is accomplished by a rheostat 26 for the feeder motor 24m and a rheostat 27 for the fan motor 25m, these rheostats being operated by motors 26m and 27m respectively, which are in turn controlled by the regulators 2 and 2'.

Current is supplied from current mains L and L' and the field windings of the motors 24m and 25m are connected directly across these mains, as shown in Figure 7.

The motor 26m is connected to the mains L and L' through a magnetic switch 28 and the motor 27m is connected to the mains through a magnetic switch 29. On the diagram, the dotted lines indicate a mechanical connection between the various parts and it will be seen that connected to each of the motors 26m and 27m is a disk having a brush contact.

Figure 3:
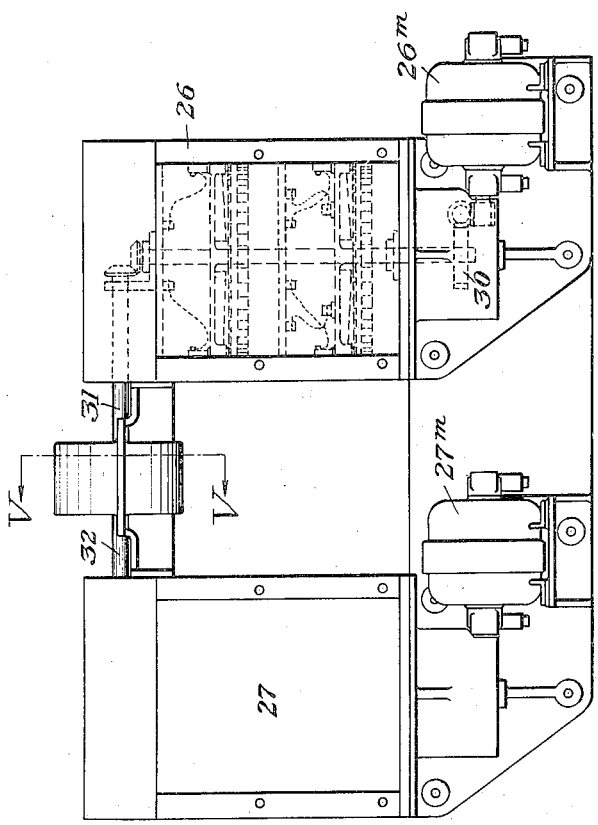
Figure 3 is a front elevation of a fuel motor rheostat and an air motor rheostat with the motors for driving the same.

This apparatus is best shown in Figures 3 to 6 inclusive. Figure 3 shows the rheostat motors connected by worm gearing 30 to the contact arms of the rheostat and also connected by bevel gears to a pair of coaxial shafts 31 and 32. The shafts 31 and 32 carry disks 33 and 34 respectively, which disks are made of insulating material and carry contact pieces 35 and 36 on their respective peripheries. The disks 33 and 34 carry brush contacts 37 and 38 adapted to make contact with the pieces 36 and 35 respectively, as the disks are rotated. As hereinafter pointed out, the contacts 35, 36, 37 and 38 are so connected as to run one of the motors 26m and 27m slightly in advance of the other, thus providing an excess of air as the combustion rate of the furnace 23 is changed.

Again referring to Figure 7, if the steam pressure rises at either of the regulators 2 or 2', the contacts 14 are bridged and current flows from the line L' through one of a pair of wires 39 and 39' to a wire 40, thence through a coil 41 and thus reversing the position of the switch 29, thence through a wire 42, through the switch 28 and a wire 43, through the feeder motor 26m to a wire 44, through a limit switch 45, a wire 46, the switch 28 and a wire 47 to the line L. Since the position of the switch 29 has been reversed, current tends to flow from the line L' through a wire 48, the switch 29, a limit switch 49, a wire 50 and the motor 27m. There are, however, only two ways back to the line wires, one of them being a wire 51 and the other a wire 52. The wire 51 is broken because the switch 29 is in reversed position and the wire 52 leads to the brush contact 38 which is not yet in contact with the contact piece 35. However, as the motor 26m continues rotating to regulate the motor 24m and cut down the rate of fuel supply, the contact piece 35 moves under the brush 38 and the circuit of the motor 27m is completed through a wire 53 having a permanent resistance 54 and a supplemental holding coil 55 for the switch 29 therein, and back to the line L through the switch 29 and a wire 56. The motors 26m and 27m continue to operate in the same direction to decrease the rate of fuel and air supplied to the furnace, but the motor 27m rotates at a slightly reduced speed on account of a resistance 54 and the contact piece 35 therefore rotates ahead of the brush 38. This rotation continues until the steam pressure at the turbines is lowered and the connection across the contacts 14 is broken by the regulator as above described. The limit switches 45 and 49 are provided for stopping the motors 26m and 27m in the event the regulator does not act before the end of the rheostats is reached. These limit switches are well known and need not be particularly described.

As soon as the contacts 14 are disconnected, the motor 26m stops and the disk 33 stops with it, but the switch 29 is maintained in reverse position by the holding coil 55 and the motor 27m continues to operate and cut down the air supply until the disk 32 has rotated a sufficient distance to move the brush 38 clear of the contact piece 35. The time required to do this is dependent upon the excess of travel of the disk 33 as compared with the disk 34 and caused by the resistance 54. It will be seen that the motors 26m and 27m are thus moved a proper distance to proportionate the rate of fuel and air supplied, while providing an excess of air as the combustion is decreased.

If the steam pressure at either of the turbines should drop, the regulator makes connection across the contacts 15, by which current flows from the line L through one of a pair of wires 57 and 57' to a wire 58. The drop in steam pressure also causes the contact bars 9 to make connection with one of a pair of contacts 59 or 59' for rendering the other regulator temporarily inoperative and allowing the regulator where the pressure is subnormal to control alone until the pressure is returned to at least normal. This is accomplished by providing magnetic switches 60 and 60' in the wires 39 and 39' respectively. If the steam pressure drops at the regulator 2, the current flows through the wire 57 and a wire 61 to the coil 62 of the magnetic switch 60' and opens the switch. If the pressure drops at the regulator 2', the current flows through the wire 57' and a wire 61' to the coil 62' of the magnetic switch 60 and opens the same to temporarily disconnect the regulator 2.

As above pointed out, when either of the regulators drops the other regulator is temporarily disconnected and current flows from the line L to the wire 58 from which it passes through a coil 63 in the magnetic switch 28, thence through a wire 64 and the switch 29, through the limit switch 49 and the wire 50 to the motor 27m, and back through the wire 51 to the line L'. With the operation of the switch 28, current tends to flow from the line L' through a wire 65, through the switch 28, the limit switch 45 and the wire 44 to the motor 26m. The operation of the magnetic switch 28, however, has opened the wire 43 and the only path back to the line L is through a wire 66 terminating in the brush contact 37. The contact piece 36, however, is not yet in contact with the brush 37 and the motor 26m remains stationary until the motor 27m has rotated the disk 34 a sufficient distance to make contact between the piece 36 and the brush 37, at which moment current flows through a wire 67 having a permanent resistance 68 and a supplemental holding coil 69 for the magnetic switch 28 therein and back to the line L through the switch 28 and a wire 70. It will be noted that the motors are operated in a direction opposite to the direction in which they were previously driven and the rheostats are therefore moved to increase the rate at which fuel and air are supplied to the furnace 23, and further that the air is increased ahead of the fuel to provide an excess of air as the combustion rate is increased. The motor 26m now rotates at a slightly lower speed than the motor 27, on account of the resistance 68, and the contact piece 36 therefore advances ahead of the brush 37 to provide additional time for the motor 26m to operate after the motor 27m has been thrown out of operation by the rise in steam pressure and consequent breaking of the connection across the contacts 15.

Figure 7 illustrates a control for a single boiler and an air control by the forced draft fan alone. Figures 8 and 9 show a system wherein a plurality of boilers are employed and wherein air control is also had by regulation of the stack damper.

Referring to Figure 8 there is shown a pair of regulators 71 and 72 controlling a fuel supply rheostat motor 73 and an air supply rheostat motor 74 through magnetic switches 75 and 76 and a time lag contactor 77 similar to that shown in Figures 5 and 6 in the same manner as in the embodiment of Figure 7. A hand regulated rheostat 73' is in series with the field of the motor 73 and a hand regulated rheostat 74' is in series with the field of the motor 74 to enable the operator to cause these motors to operate at any desired constant speed. This system may be designed to accurately vary the proportion between the rate of fuel and air supplied at different boiler ratings with the advantages attendant thereto, as set forth in my Patent No. 1,659,552, or as shown in the patent to Hess and Benjamin No. 1,518,924. Here the boilers are provided with feed motors 78 connected to the line wires L and L' by wires 79 and starting boxes 80. The current from the fields 81 of the motor 78 may be drawn from the line wires L and L' through wires 82 having a hand-controlled resistance therein, or from a pair of wires $L^2$ and $L^3$ connected to a generator 84. Field transfer switches 85 are provided for changing from one to the other and the current is drawn from the lines $L^2$ and $L^3$ when automatic regulation is desired. These switches enable the operator to transfer the stoker motors from the wires L and L' to the wires $L^2$ and $L^3$, or vice versa, without interrupting the stoker operation, and are particularly described and claimed in my Patent No. 1,574,548.

Hand-adjusted resistances 86 are provided for individually varying the speed of any of the motors 78 according to the condition of the boiler. For example, a dirty boiler may be connected in parallel with a clean boiler and it will then be necessary to adjust the speed of the motors 78 to properly divide the load between them, and this can be readily accomplished by the resistances 86 where an automatic control or varying steam pressure is desired, or by the resistances 83 where the field current of the motors 78 is supplied from the lines $L^2$ and $L^3$.

The generator 84 is driven by a motor 87 connected to the lines L and L' through wires 88 and a starting box 89. The field winding 90 of the generator 84 is connected across the lines L and L' by wires 91 and 92 through a rheostat 93 operated by the motor 73 and thence through a hand-controlled resistance 94 and a wire 95. As the motor 73 is operated in accordance with variations in the steam pressure, the current in the field windings 90 is varied and the current supplied to the lines $L^2$ and $L^3$ by the generator 84 varies in a corresponding amount. This, in turn, varies the intensity of the fields 81 and serves to regulate the rate at which fuel is supplied to the boilers.

The rate of air supply in this embodiment of the invention is controlled by adjusting the stack dampers and also by shifting the brushes on the fan motors. The fan motors 96 are connected to current mains $L^4$ through starting boxes 97 and are each provided with brush-shifting motors 98. The stack dampers are controlled by stack damper motors having a current control actuated by the pressure in the furnace, as set forth in my Patent No. 1,583,440.

As set forth in that patent, the stack damper control includes a gasometer float adapted to make electrical connection for operating a stack damper motor and having a pressure connection between the gasometer and the combustion chamber of the furnace. Sufficient of that apparatus will be described here to clearly show the manner in which the apparatus is used in connection with the present invention.

Referring to Figure 9, there is shown an oil chamber 99 in which there is provided a gasometer bell 100. A pressure connection 101 passes through the oil chamber 99 up into the gasometer bell 100 and the immersion of the bell therefore varies with the pressure communicated from the combustion chamber of the furnace by the pipe 101. The gasometer bell 100 carries a vertical rod 102 having a cross bar 103 thereon carrying contacts 104. If the pressure under the bell 100 increases, the bell is raised and the cross arm 103 bridges a pair of contacts 105, while if the pressure drops, the cross arm drops accordingly and bridges a pair of contacts 106.

The stack damper is operated by a motor 107 supplied with current from the lines L and L' through wires 108 and 109. A wire 110 leads through a three-way switch 111 to the contacts 105 and 106 at one end of the cross bar 103, while wires 112 and 113 lead from the contacts 105 and 106 respectively at the other end of the cross bar. The wire 112 leads through a magnet 114 and thence through a wire 115 back to the line, while the wire 113 leads through a magnet 116 to the wire 115 and back to the line. If the pressure in the furnace chamber rises, the bell 100 is moved upwardly, the contacts 105 are bridged, and current flows through the wire 110 and the wire 112 to the magnet 114. The magnet serves to close a switch 117 and to open a switch 117', whereupon the current flows from the wire 108 through the switch 117 and a wire 118, through the motor 107 and thence through a wire 119, a switch 120 and a wire 121 to the field winding 122 of the motor and thence to the wire 109. The motor continues to operate and open the stack damper until the pressure in the furnace chamber drops and breaks the connection between the contacts 105 at which time the magnet 114 is de-energized and the motor 107 stops.

If the pressure in the combustion chamber falls, the contacts 106 are bridged and current flows through the wires 110 and 113 to the magnet 116 and thence through the wire 115 back to the line. When the magnet 116 is energized it is effective to close a switch 123 and open the switch 120 and current flows from the wire 108, through the switch 123 and the wire 119 to the motor 107, from which it passes through the wire 118, the switch 117' and the wire 121 to the field winding 122 and thence to the wire 109. It will be seen that the motor is now operating in a reverse direction and serves to close the damper and build up the pressure in the combustion chamber. Limit switches 124 are connected to the damper by a rod 125 for preventing overtravel thereof.

The three-way switch 111 is provided in case it is desired to manually operate the damper. By throwing the switch to the left as viewed in Figure 9, the current will flow through the wire 110 and the switch 111 to a wire 126 and thence to the magnet 114 for opening the damper, while if the switch is thrown to the right, the current will flow from the wire 110 through the switch 111 and a wire 127 to the wire 113 to the magnet 116, thereby operating the motor 107 to close the damper.

This apparatus is provided for each of the boilers and Figure 8 illustrates it as applied to two boilers. The construction of the apparatus differs from that shown in my Patent No. 1,583,440, in that an additional oil chamber 128 having a plunger 129 therein is provided. The chamber 128 is connected to the chamber 99 through a passage 130' and it will be seen that as the immersion of the plunger 129 is varied, the oil level in the chambers 99 and 128 will be varied and thereby actuate the gasometer bell 100 to control the stack damper.

A torque motor 130 is provided for each of the plungers 129 and is connected thereto by an arm 131.

The torque motors are all controlled by the centralized system for varying the furnace draft or rate of air supply in each of the boilers comprising the battery. This is accomplished by connecting the motor 74 to a rheostat 132 for each of the torque motors 130. Current passes to each of the torque motors 130 from the line L' through a wire 133 from which it passes through the coils 134 of the motor 130 and thence through a wire 135 to the rheostat 132. From the rheostat 132 it passes to the line L through a wire 136 having a hand controlled rheostat 137 therein for individually varying the setting for the various boilers to compensate for the difference in their condition in a manner similar to the rheostats 83 and 86. The torque motor 130 is simply a large sized volt meter in principle. The armature consists of a permanent magnet and it is deflected in an amount corresponding to the flow of current through the pole windings 134 and consequently corresponding to the setting of the rheostat 132. From this it will be apparent that the setting of the stack damper in each of the boilers is controlled from the regulators 71 and 72.

The brush shifting motors 98 are connected across the wires 108 and 109 and are operated every time the motors 107 are operated and in a corresponding direction, as will be apparent from Figure 8. From this it will be seen that the brushes of the motor 96 are shifted as the stack damper is regulated, thus securing a double control of the air supply.

By selecting motors of varying characteristics, or by varying the amount of resistance between different contacts on the motor-operated rheostats, I can very accurately vary the fuel-air ratio at varying loads as desired.

I provide for regulating the combustion rate of a furnace and also provide an excess of air as the combustion rate is changed.

Any number of furnaces may be regulated and their individual differences taken care of while properly dividing the load over the entire battery. I further provide for regulating the combustion rate according to a condition of the steam when the system is used in connection with a boiler plant and for controlling from a number of points so interconnected that the steam condition is maintained at least up to normal at each point. While in the described embodiment of the invention there has been described a regulator system responsive to variations in steam pressure, it will be obvious that a variation in any other steam condition may be utilized, as for example, by using a flow meter or similar device and regulating in accordance with steam velocity.

I provide for imposing a varying normal load on a system according to a predetermined time-load relation and the apparatus will therefore automatically take care of the usual peak loads with great economy.

While I have illustrated the present preferred embodiment of the invention, it will be understood that it is not limited thereto, as it may be otherwise embodied within the scope of the following claims.

I claim:

1. A steam regulator including time-controlled means for establishing a normal pressure, said means being effective for adjusting such normal pressure at various desired times, and means for maintaining substantially constant the pressure imposed by the timed-controlled means.

2. A steam regulator including control means responsive to a condition of the steam, and also responsive to a pre-determined time-load relation.

3. A steam regulator including a movable control element, pressure actuated means for moving the same, and time-controlled means for moving the same.

4. In combination with a steam boiler furnace, means regulating the rates of supply of the elements of combustion to the furnace, time-controlled means for varying such rates of supply to provide a varying condition of the steam, and control means responsive to a condition of the steam for maintaining substantially constant the condition imposed by the time-controlled means.

5. In combination with a steam boiler furnace, means regulating the rates at which fuel and air are supplied to the furnace, time-controlled means for varying such rates to vary a condition of the steam, means tending to maintain substantially constant the steam condition imposed by the time controlled means, and means for providing an excess of air during a period of change in the rate of supply.

6. In combination with a steam boiler furnace, time-controlled means for varying the combustion rate to effect a change in a condition of the steam, and control means responsive to a condition of the steam and effective for varying the combustion rate to maintain substantially constant the steam condition imposed by the time-controlled means.

7. A steam regulator including a movable control member, means for moving the same to vary a condition of the steam, and means responsive to a condition of the steam and also acting on the movable control member for maintaining substantially constant the condition imposed by the first-mentioned means.

8. A steam regulator including a movable control member, time-controlled means for moving the member to vary a condition of the steam in accordance with a pre-determined time-load relation, and means responsive to a condition of the steam for maintaining substantially constant the condition imposed by the time-controlled means.

9. A steam regulator including a movable control member, time-controlled means for moving the member to vary a condition of the steam in accordance with a pre-determined time-load relation, means responsive to a condition of the steam for maintaining substantially constant the condition imposed by the time-controlled means, and means for varying the time-load relation as desired.

10. A steam regulator including a control member movable about either of two spaced pivot points, means for moving it about one of the pivot points to vary a condition of the steam, and means responsive to a condition of the steam for moving it about the other pivot point for maintaining substantially constant the condition imposed by the first-mentioned means.

11. A steam regulator including a pressure cylinder, a plunger therein movable with variations in steam pressure, means for balancing the pressure, a regulating member movable by the plunger and effective to maintain the steam substantially at normal pressure, and time-controlled means for varying the normal pressure which is to be maintained.

12. A steam regulator including a pressure cylinder, a plunger therein movable with variations in steam pressure, means for balancing the pressure, a regulating member movable by the plunger and effective to maintain the steam substantially at normal pressure, and time-controlled means for varying the normal pressure which is to be maintained, the time-controlled means comprising a drum movable at a fixed rate having adjustable contact points for adjusting the position of the regulating member.

13. A steam regulator including a pressure cylinder, a plunger therein movable with variations in steam pressure, a counterweight for the plunger, a regulating member movable by the plunger and effective to maintain the steam substantially at a normal pressure, and time-controlled means for varying the normal pressure which is to be maintained, the pressure cylinder and counterweight being pivotally supported.

14. A steam regulator including electrical control contacts, means responsive to a condition of the steam and effective for shifting a contact relative to its corresponding contact to maintain substantially constant a steam condition imposed on the regulator, and means for relatively shifting the contacts to impose on the regulator the condition to be maintained.

15. A steam regulator including electrical control contacts, time-controlled means for moving a contact relative to its corresponding contact for varying a condition of the steam, and means responsive to a condition of the steam for shifting the contacts to maintain substantially constant the condition imposed by the time-controlled means in a pre-determined time-load relation.

16. Combustion apparatus including a fuel supply control rheostat and an air supply control rheostat for regulating the rate at which fuel and air are supplied, and means for actuating one of the rheostats ahead of the other from any setting of the rheostats to give an excess of air when the rate is being varied.

17. In combination with a steam boiler furnace having means for regulating the rate at which fuel and air are supplied thereto, a plurality of control means, at different points and responsive to a steam condition at such points, for the regulating means, said control means being effective for maintaining the steam condition at least up to a pre-determined amount at any of the different points.

18. In combination with a steam boiler and furnace having means for regulating the rate at which fuel and air are supplied thereto, a plurality of control means, at different points and responsive to a steam condition, for the regulating means, said control means being interconnected, whereby a control means at a point where the steam condition is below a pre-determined amount will render the remaining control means temporarily inoperative and will control alone until the condition has returned to normal.

19. In steam regulating apparatus, control means at a plurality of points in the steam system, and means actuated by one of such control means for rendering the other control means temporarily inoperative when a condition of the steam at the point where such control means is located passes beyond a pre-determined limit, whereby the control means tend to maintain the condition of the steam on the proper side of such limit at all points.

20. In a steam system, a plurality of control means at different points responsive to a condition of the steam and effective to maintain it at a pre-determined normal, and means actuated by a control means at any of such points where the condition of the steam is below normal, for rendering the other control means temporarily inoperative, whereby the one control means controls alone until the condition of the steam is brought up to normal at such point.

21. In a steam system, a plurality of control means at different points responsive to a condition of the steam and effective to maintain it at a pre-determined normal, means actuated by a control means at any of such points where the condition of the steam is below normal, for rendering the other control means temporarily inoperative, whereby the one control means controls alone until the condition of the steam is brought up to normal at such point, and time-controlled means for varying such normal pressure.

22. In a steam system, a plurality of control means at different points responsive to a condition of the steam and effective to maintain it at a pre-determined normal, means actuated by a control means at any of such points where the condition of the steam is below normal, for rendering the other control means temporarily inoperative, whereby the one control means controls alone until the condition of the steam is brought up to normal at such point, said means comprising electrical contacts at each of the control points adapted to make connection when the control means is moved by a pressure drop, and means at the other control means actuated by such connection for rendering said control means inoperative as long as the connection is maintained.

23. In a steam regulator, a plurality of electrical control means at different points comprising a contact movable in response to variations in a condition of the steam and adapted to make electrical connection on such movement effective to maintain the steam condition at a pre-determined normal, and a contact at each of said points adapted to make electrical connection with a magnetic switch for breaking a normally closed electric connection and rendering the other control means inoperative as long as such connection is maintained, the contact being adapted to make such connection when the condition at such point falls below a pre-determined normal.

24. In a steam regulator, a plurality of electrical control means at different points comprising a contact movable in response to variations in a condition of the steam and adapted to make electrical connection on such movement effective to maintain the steam condition at a pre-determined normal, a contact at each of said points adapted to make electrical connection with a magnetic switch for breaking a normally closed electric connection and rendering the other control means inoperative as long as such connection is maintained, the contact being adapted to make such connection when the condition at such point falls below a pre-determined normal, and time-controlled means for varying said pre-determined normal.

25. In combination with combustion apparatus having means regulating the supply of fuel and air thereto, a rheostat for controlling the rate of fuel supply, a rheostat for controlling the rate of air supply, motors for driving the rheostats to vary the rate of fuel and air supply, and means for starting the air rheostat motor before the fuel rheostat motor as the rate of fuel and air supply is increased, and for starting the fuel rheostat motor before the air rheostat motor as the rate of fuel and air supply is decreased, said means being so effective regardless of the setting of the rheostats when a change is to be effected.

26. In combination with combustion apparatus having means regulating the supply of fuel and air thereto, a rheostat for controlling the rate of fuel supply, a rheostat for controlling the rate of air supply, motors for driving the rheostats to vary the rate of fuel and air supply, and means for starting the air rheostat motor before the fuel rheostat motor as the rate of fuel and air supply is increased, for starting the fuel rheostat motor before the air rheostat motor as the rate of fuel and air supply is decreased, and for operating each of the motors for a proper length of time to proportionate the rate of fuel and air supply, said means being so effective regardless of the setting of the rheostats when a change is to be effected.

27. In combination with combustion apparatus having means regulating the supply of fuel and air thereto, a rheostat for controlling the rate of fuel supply, motors for driving the rheostats to vary the rate of fuel and air supply, and means for starting the air rheostat motor before the fuel rheostat motor as the rate of fuel and air supply is increased, for starting the fuel rheostat motor before the air rheostat motor as the rate of fuel and air supply is decreased, and for operating each of the motors for a proper length of time to proportionate the rate of fuel and air supply, the last mentioned means including a pair of contacts normally out of contact with one another but relatively movable by either of the motors and adapted to make electrical connection and start the other motor as soon as they contact with one another and to maintain that motor in operation after the first motor stops and until the contacts are relatively moved by the second motor to break the electrical connection.

28. Control apparatus for a motor for regulating the rate of air supply and a motor for regulating the rate of fuel supply to a combustion apparatus, including a pair of contacts normally out of contact with each other but relatively movable by either of the motors and adapted to make electrical connection for starting the other motor and maintaining the same in operation after the first motor stops and until the contacts are relatively moved to break the electrical connection.

29. Control apparatus for a motor for regulating the rate of air supply and a motor for regulating the rate of fuel supply to a combustion apparatus, including a pair of contacts normally out of contact with each other but relatively movable by either of the motors, but at different speeds, and adapted to make electrical connection for starting the other motor and maintaining the same in operation after the first motor stops and until the contacts are relatively moved to break the electrical connection.

30. Control apparatus for a motor for regulating the rate of air supply, a motor for regulating the rate of fuel supply to a combustion apparatus, including a pair of coaxial disks having contacts over a portion thereof and normally out of contact with each other but relatively rotatable by either of the motors and adapted to make electrical connection for starting the other motor after the first motor stops and until the disks are relatively rotated to break the electrical connection.

31. Combustion apparatus including a motor for regulating the rate of air supply, a motor for regulating the rate of fuel supply, rheostats for the motors, motors for operating the rheostats, and a pair of contacts normally out of contact with one another but relatively movable by one of the rheostat motors and adapted to make electrical connection to start the other rheostat motor and maintain the same in operation after the first motor stops and until the contacts are relatively moved to break the electrical connection.

32. Combustion apparatus including a motor for regulating the rate of air supply, a motor for regulating the rate of fuel supply, rheostats for the motors, motors for operating the rheostats, a pair of contacts normally out of contact with one another but relatively movable by one of the rheostat motors and adapted to make electrical connection to start the other rheostat motor and maintain the same in operation after the first motor stops and until the contacts are relatively moved to break the electrical connection, and means for effecting a relative movement when both motors are running.

33. Combustion apparatus including a motor for regulating the rate of air supply, a motor for regulating the rate of fuel supply, rheostats for the motors, motors for operating the rheostats, a pair of contacts normally out of contact with one another but relatively movable by one of the rheostat motors and adapted to make electrical connection to start the other rheostat motor and maintain the same in operation after the first motor stops, and until the contacts are relatively moved to break the electrical connection, and a resistance in the circuit of the second motor.

34. Apparatus for controlling a plurality of furnaces, including means for regulating the rate of fuel supply at each of the furnaces, means for regulating the rate of air supply at each of the furnaces, control means for varying said means to vary the combustion rate, and means for automatically providing an excess of air in each of the furnaces as the combustion rate is being changed.

35. Apparatus for controlling a plurality of furnaces having independently driven fuel and air supply means, including means for regulating the rate of fuel supply at each of the furnaces, means for regulating the rate of air supply at each of the furnaces, control means for varying both said means to vary the combustion rate, means for providing an excess of air in each of the furnaces as the combustion rate is being changed, and means for individually varying each of the first and second mentioned means to compensate for furnace differences.

36. Apparatus for controlling a plurality of steam boiler furnaces, including means for regulating the rate of fuel supply at each of the furnaces, means for regulating the rate of air supply at each of the furnaces, control means therefor responsive to a condition of the steam and effective for varying the combustion rate to maintain such condition substantially constant, and means for providing an excess of air in the furnace as the combustion rate is changed, said means being so effective over substantially the range of the variation.

37. Apparatus for controlling a plurality of steam boiler furnaces, including means for regulating the rate of fuel supply at each of the furnaces, means for regulating the rate of air supply at each of the furnaces, control means therefor responsive to a condition of the steam and effective for varying the combustion rate to maintain such condition substantially constant, means for individually varying each of the first and second mentioned means to compensate for furnace differences, and means for providing an excess of air in the furnaces as the combustion rate is changed, said means being so effective over substantially the range of the variation.

38. Apparatus for controlling a plurality of steam boiler furnaces including means for regulating the rate of fuel supply at each of the furnaces, means for regulating the rate of air supply at each of the furnaces, time-controlled means effective to control the first and second mentioned means for varying the combustion rate and thus vary a condition of the steam, and means responsive to a condition of the steam for maintaining substantially constant the condition imposed by the time-controlled means.

39. Apparatus for controlling a plurality of steam boiler furnaces including means for regulating the rate of fuel supply at each of the furnaces, means for regulating the rate of air supply at each of the furnaces, time-controlled means effective to control the first and second mentioned means for varying the combustion rate and thus vary a condition of the steam, means responsive to a condition of the steam for maintaining substantially constant the condition imposed by the time-controlled means, and means for providing an excess of air as the combustion rate is being varied.

40. Apparatus for controlling a plurality of steam boiler furnaces including means for regulating the rate of fuel supply at each of the furnaces, means for regulating the rate of air supply at each of the furnaces, time-controlled means effective to control the first and second mentioned means for varying the combustion rate and thus vary a condition of the steam, means responsive to a condition of the steam for maintaining substantially constant the condition imposed by the time-controlled means, and means for individually varying each of the first and second mentioned means to compensate for furnace differences.

41. Apparatus for controlling a plurality of steam boiler furnaces including means for regulating the rate of fuel supply at each of the furnaces, means for regulating the rate of air supply at each of the furnaces, time-controlled means effective to control the first and second mentioned means for varying the combustion rate and thus vary a condition of the steam, and means for individually varying each of the first and second mentioned means to compensate for furnace differences.

42. Combustion apparatus including a plurality of separate control means controlling separate factors in the operation of apparatus, and means for putting the same into operation one after another and operating the same over time periods of substantially equal length.

43. Combustion apparatus including fuel and air supply means, control means therefor and means for putting the control means into operation one after another and operating the same over time periods of substantially equal length.

44. Combustion apparatus including fuel and air supply means, electric motors therefor, rheostats for controlling the motors and means for putting the rheostats into operation one after another and operating the same over time periods of substantially equal length.

45. The method of regulating a furnace having a function responsive means movable between limits with changes in the value of a function of the furnace, which includes changing the rate of supply of an element of combustion to the furnace when the function responsive means moves to one of said limits, and varying the change in value of said function required to cause movement of the function responsive means to said limit.

46. Furnace control apparatus including a member movable between limits in response to changes in the value of a function of the furnace, means for regulating the rate of supply of an element of combustion to the furnace, means for adjusting said means when the function responsive member reaches one of said limits, and means for varying the change in value of the function required to cause the member to move to said limit.

47. Furnace control apparatus including a member movable between limits in response to changes in the value of a function of the furnace, electric switching means at said limits, means for regulating the rate of supply of an element of combustion to the furnace, means electrically connected with said switches for adjusting said regulating means when the function responsive member reaches one of said limits, and means for varying the change in value of the function required to cause the member to move to said limit.

48. In a control for combustion apparatus, means responsive to a function of the apparatus, means actuated thereby and adjustable between limits for varying the rate at which fuel and air are supplied to the apparatus, said means being adapted to take any of a plurality of intermediate positions in accordance with the response of the first mentioned means, and means for automatically providing an excess of air as the combustion rate is being varied.

49. Combustion apparatus including a plurality of furnaces, means for supplying an element of combustion thereto, control means responsive to a function of the battery for varying the rate of supply of said element of combustion to the several furnaces in the battery, and means for isolating at least one of the furnaces in the battery from the battery control while leaving the remaining furnaces susceptible to such control.

50. Combustion apparatus including a plurality of furnaces, means for supplying an element of combustion thereto, control means responsive to a function of the battery for varying the rate of supply of said element of combustion to the several furnaces in the battery, means for isolating at least one of the furnaces in the battery from the battery control while leaving the remaining furnaces susceptible to such control, and means for controlling the furnaces so isolated from the battery control independently of the battery control.

51. Control apparatus including a plurality of separate control means controlling separate factors in the operation of apparatus, and means for putting the control means into operation one after another and operating the same over time periods of substantally equal length.

52. Control apparatus including a plurality of separate control means controlling separate factors in the operation of apparatus, and means for initiating the operation of one of said motors before one of the others and operating the respective motors substantially the same length of time.

53. A control system for apparatus having a factor which tends to vary in opposite directions during operation of said apparatus, comprising a plurality of control means which operate when said factor varies in one direction with one of said control means beginning before a second control means, and which operate when said factor varies in the opposite direction with said second control means beginning before the one control means, the one control means being operated substantially the same length of time as the second control means.

54. A combustion control system comprising in combination with a furnace having means for feeding thereto the elements of combustion, regulating means for said feeding means comprising a pilot motor normally inoperative, means for effecting an operation of said motor at a substantially constant predetermined speed, and means for adjustably fixing the rate at which the regulating means adjusts the feeding means, said last-named means including an adjustable rheostat in the circuit of said pilot motor for establishing the predetermined pilot motor speed.

55. A combustion control system comprising in combination with a furnace having a plurality of means for feeding thereto various elements of combustion, regulating means for each of the feeding means comprising separate pilot motors normally inoperative, means for effecting an operation of said motors at a substantially constant predetermined speed, and means for adjustably fixing the relative rates at which the various regulating means adjust their feeding means, said last means including adjustable rheostats in the circuits of said various pilot motors.

56. In combination with a furnace, variable means for feeding thereto one of the elements of combustion, said means including a feeding motor and an adjusting motor, variable means for feeding another element of combustion and including another feeding motor and another adjusting motor, separate variable rheostats in the circuits of said respective adjusting motors for controlling the relative rates of response of the adjusting motors, and means for simultaneously energizing and de-energizing both of said adjusting motors.

57. In combination, a furnace, a variable fuel feed for the furnace, means for varying the rate of fuel feed including an adjusting motor, a rheostat for controlling the rate of response of said motor, a pair of firing control wires, and relays for closing the connections of said adjusting motor for forward or reverse operation, said relays being controlled selectively by the firing control wires.

58. In a control system, a furnace, fuel supply means and air supply means for the furnace, devices for controlling said supply means, pilot motors for controlling said devices, means for closing the circuits of said motors in common, and an adjustable rheostat in the circuits of each of said pilot motors for adjusting the rate of response of said motors.

59. In combination, a plurality of variable speed motors, separate means for varying the speeds of the respective motors, separate normally inoperative pilot motors for controlling the respective means, means for effecting an operation of said pilot motors at substantially constant predetermined speeds, and variable rheostats individual to certain of said pilot motors for adjustably fixing the relative predetermined constant speeds of said pilot motors.

60. A control system for apparatus having a factor which tends to vary from a predetermined value during operation of said apparatus, means for maintaining said factor at said predetermined value comprising means for causing an adjustment of the value of the factor, a constant speed normally inoperative pilot motor which when operated tends to operate said last-named means, and a rheostat for adjustably fixing the speed of said motor.

61. A control system for apparatus having a factor which tends to vary from a predetermined value during operation of said apparatus, means for maintaining said factor at said predetermined value comprising means for causing an adjustment of the value of the factor, a normally ineffective pilot motor which when made effective tends to operate said last-named means, and a rheostat for adjustably fixing the speed of said motor.

In testimony whereof I have hereunto set my hand.

MERRILL G. BENJAMIN.